United States Patent
Karais et al.

(10) Patent No.: US 8,662,275 B2
(45) Date of Patent: Mar. 4, 2014

(54) SYNCHRONIZING RING OF A SYNCHRONIZING DEVICE

(75) Inventors: Thomas Karais, Nuremberg (DE); Josef Schwuger, Hoechstadt (DE); Marcus Spoerl, Rednitzhembach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 701 days.

(21) Appl. No.: 12/520,742

(22) PCT Filed: Dec. 6, 2007

(86) PCT No.: PCT/EP2007/063421
§ 371 (c)(1),
(2), (4) Date: Jun. 22, 2009

(87) PCT Pub. No.: WO2008/077734
PCT Pub. Date: Jul. 3, 2008

(65) Prior Publication Data
US 2010/0012452 A1    Jan. 21, 2010

(30) Foreign Application Priority Data

Dec. 23, 2006 (DE) .......................... 10 2006 061 414

(51) Int. Cl.
*F16D 23/06* (2006.01)
*F16D 69/00* (2006.01)

(52) U.S. Cl.
USPC ................. 192/107 R; 192/53.32; 192/53.34; 192/113.36

(58) Field of Classification Search
USPC .................................... 192/53.32, 66.2, 66.21
See application file for complete search history.

(56) References Cited

U.S. PATENT DOCUMENTS

| 2,824,635 | A | * | 2/1958 | Troendly et al. | ............. | 192/45.1 |
| 2,940,567 | A | * | 6/1960 | Dodge | .......................... | 192/45.1 |
| 3,203,522 | A | | 8/1965 | Schmid | | |
| 5,038,628 | A | * | 8/1991 | Kayama | .......................... | 74/339 |
| 5,167,312 | A | | 12/1992 | Thirion de Briel et al. | | |
| 5,184,704 | A | * | 2/1993 | Hays | ......................... | 192/107 M |
| 5,657,844 | A | | 8/1997 | Wagner | | |
| 6,089,363 | A | * | 7/2000 | Mimura | .......................... | 192/45 |
| 6,732,846 | B2 | * | 5/2004 | Diemer et al. | ............. | 192/107 R |
| 2006/0289262 | A1 | * | 12/2006 | Takasu | .......................... | 192/45.1 |

FOREIGN PATENT DOCUMENTS

| AT | 1 07 755 | 11/1927 |
| DE | 3705657 A | 2/1987 |
| DE | 37 05 657 Y | 9/1988 |
| DE | 41 30 984 Y | 3/1992 |
| DE | 4130984 A | 3/1992 |
| DE | 197 18 905 A | 11/1998 |
| EP | 0717212 A1 | 6/1996 |
| EP | 1141567 B1 | 5/2003 |
| FR | 1 474 750 Y | 3/1967 |
| FR | 1474750 A | 3/1967 |

(Continued)

OTHER PUBLICATIONS

Office Action, Japanese Patent Application No. 2009-541963, dated Nov. 13, 2012.

*Primary Examiner* — Rodney Bonck
(74) *Attorney, Agent, or Firm* — Volpe and Koenig, P.C.

(57) ABSTRACT

A synchronizing ring for a synchronizing device of a motor vehicle gearing with a ring body. The ring body has a plurality of recesses, and frictional elements are arranged in the recesses.

12 Claims, 3 Drawing Sheets

(56) References Cited

FOREIGN PATENT DOCUMENTS

| | | |
|---|---|---|
| JP | S63-289329 A | 11/1988 |
| JP | 02041723 U | 3/1990 |
| JP | H08219173 A | 8/1996 |
| JP | 2004257552 A | 9/2004 |
| JP | 2005155703 A | 6/2005 |
| WO | 00/37815 Y | 6/2000 |
| WO | 0037815 A | 6/2000 |

* cited by examiner

SYNCHRONIZING RING OF A SYNCHRONIZING DEVICE

This application is a 371 of PCT/EP2007/063421 filed Dec. 6, 2007, which in turn claims the priority of DE 10 2006 061 414.3 filed Dec. 23, 2006, the priority of both applications is hereby claimed and both applications are incorporated by reference herein.

FIELD OF THE INVENTION

The invention relates to a synchronizing ring of a synchronizing device of a motor vehicle transmission, with an annular body which has a plurality of recesses, friction elements being arranged in the recesses.

BACKGROUND OF THE INVENTION

Synchronizing rings of a vehicle transmission are formed, as a rule, by a conically designed friction ring with friction surfaces on its inner surface area or its outer surface area. If the friction ring has friction surfaces on both surface areas, it is also designated as an intermediate ring. The friction surfaces of an intermediate ring are frictionally connected, during the synchronizing operation on the outer casing, to a friction surface formed on the outer synchronizing ring. At the same time, a friction surface formed on the inner surface area of the intermediate ring is in frictional contact with a friction surface of an inner synchronizing ring. The outer synchronizing ring is connected positively to the synchronizing body and engages into clearances of the inner synchronizing ring, for example, via driver noses which are formed on its side of smaller diameter and which are directed radially inward. The inner synchronizing ring is therefore likewise connected positively to the synchronizing body via the outer synchronizing ring.

A synchronizing device of this type consists of a large number of individual parts and is therefore complicated to produce. For the mass manufacture, it has proved appropriate to produce synchronizing rings in a non-cutting manner from sheet metal by forming. The rings produced by forming, however, have mostly a friction surface which does not satisfy the accuracies required. As a rule, therefore, a cutting remachining or honing is necessary. If a friction lining is glued to a friction surface/any inaccuracies of the annular body are transferred to the friction surface which, in turn, has to be reworked. The application of a friction lining, for example, by adhesive bonding is therefore complicated and cost-intensive.

To avoid this problem, it is proposed in AT 107 755 to subdivide the friction lining into a plurality of elements and to assemble the friction lining in the size and shape desired in each case from a greater or lesser number of such elements. The friction ring consists of a basic body with holes, the walls of which have a conical configuration. Friction bodies are pushed into the holes. A sheet in the form of an arc of a circle is fastened to the basic body by means of screws, and the friction elements are held positively on the inner side of the sheet. In this friction ring, it is necessary that the friction bodies either are held positively by means of relatively complicated and difficult to mount accessories or else are individually fastened non-positively. Both measures require a considerable outlay in terms of production.

A further generic synchronizing ring is known from DE 37 05 657 A1. A synchronizing ring is presented which has a basic body as a supporting ring and which is provided with a friction lining, the friction lining being assembled from a multiplicity of friction bodies which are distributed over the circumference of the friction surface. The friction elements are pressed positively into open recesses of the supporting ring. This method is suitable particularly for sintered rings, but not for all types of friction linings. If the supporting ring and the friction elements are not remachined, then some friction elements are subjected to very much higher load than others when the synchronizing device is in shift operation, and this may lead to a failure of this synchronizing ring.

OBJECT OF THE INVENTION

The object on which the invention is based, therefore, is to avoid the disadvantages outlined in the prior art.

According to the invention, this object is achieved by a synchronizing ring where the annular body forms a cage, which guides the friction elements in the recesses. The friction elements is held displaceably or rotatably in the recesses. When a gear is shifted, the synchronizing ring is displaced axially, and it bears both against the synchronizing body and against the countercone which is connected directly or indirectly to the gear selection wheel. Since the friction elements can change their position with respect to the annular body by the amount of a small play, it is possible to compensate manufacturing inaccuracies both of the annular body and of the countercone. Advantageously, therefore, not only is the reworking of the annular body dispensed with, but also the remachining of the countersurfaces which are in frictional contact. The invention thus at the same time makes it possible to have a more beneficial production of, for example, an outer and an inner synchronizing ring.

What is achieved by the axial displaceability and rotatability of the friction elements is that the ring is not supported on its counterfaces only via a few points, but via all the friction elements. A higher load-bearing capacity or performance of the friction clutch is also consequently achieved.

The recesses of the synchronizing ring are adapted as pockets or apertures to the shape of friction elements. In a development of the invention, the pockets are designed to be larger than the friction elements and on at least one side have holding noses which guide the friction elements.

In an advantageous embodiment of the invention, the annular body is produced from sheet metal in a non-cutting manner and by forming. In this case, it is advantageous to introduce the recesses into the annular body before the synchronizing ring is brought to its final shape, for example by deep drawing. In a particularly simple way, thin-walled sheet metal material is used, from which the recesses are punched out. Alternatively, it is possible to produce the annular body from plastic.

The friction elements are produced separately from the annular body and are connected mechanically to the annular body simultaneously or in succession. They can be produced highly cost-effectively, since exact dimensional stability is not important in mass manufacture, since the manufacturing inaccuracies are compensated by means of the arrangement according to the invention.

In a development of the invention, the friction elements have a convex surface. They may, for example, be curved spherically outward and inward, the curvature in the radial direction not deviating substantially from that of the synchronizing ring. The convex shape avoids a support of the friction bodies on body edges during tilting, and therefore the local loads fall due to large-area bearing contact.

In a further embodiment, the recesses have noses, via which the friction elements are connected to the annular body. The noses may also be designed, in general, as one or more holding points. In production by punching, even complex shapes can be implemented in a simple way. Alternatively to this, the friction elements have projections, via which the friction body is operatively connected to the annular body.

The invention makes it possible, furthermore, that the same annular body can be employed for various intended uses. For the respective application, the suitable friction elements can then in each case be paired on the modular principle. Contrary to previous coated intermediate rings, according to the invention even different frictional materials can be used in a simple way in the same synchronizing device. For this purpose, friction elements consisting of different materials are placed in each case alternately into the recesses.

Sintered material consisting of brass material or carbon has proved to be suitable material for the friction elements. The friction elements may consist entirely of the friction material. However, they may also be constructed from a material which is coated with another material.

In a development of the invention, the friction elements are spaced apart from one another in the circumferential direction in the installed state. As a result, grooves are formed which run in each case in the axial direction from the axial ends of the synchronizing ring. The grooves serve for receiving the oil which has to be discharged during the synchronization process. In order to assist the discharge of oil during synchronization, in another development of the invention the friction elements are provided with structural surfaces. The structural surfaces likewise serve for improving the tribological properties. These may be, for example, small oil channels introduced crosswise.

According to another embodiment of the invention, the friction elements have a lozenge shape which is not rectangular. The grooves therefore run obliquely with respect to the axial direction, thus accelerating the oil discharge when the synchronizing ring is rotating. This may also be assisted in that the grooves widen toward one axial end. This is achieved in that the friction elements have an irregular quadrangular shape in the form of a sheared trapezium.

The invention also relates to a synchronization with at least one synchronizing ring and with a countercone having a friction countersurface. The countercone may, for example, be arranged directly on the gear selection wheel or else also directly on the synchronizing body. As a result of the freedom of movement in the annular body, manufacturing inaccuracies in these countersurfaces can also be absorbed, so that there is no need for these to be remachined. A cost saving likewise with regard to the other components of the synchronizing device is thereby achieved.

The invention thus makes it possible in a simple way to provide a friction ring for a synchronization, said friction ring being load-bearing at a large number of points simultaneously and therefore having low wear and a good running-in behavior.

BRIEF DESCRIPTION OF THE DRAWINGS

The invention is explained below with reference to several drawings in which.

DETAILED DESCRIPTION OF THE DRAWINGS

Figure 1:
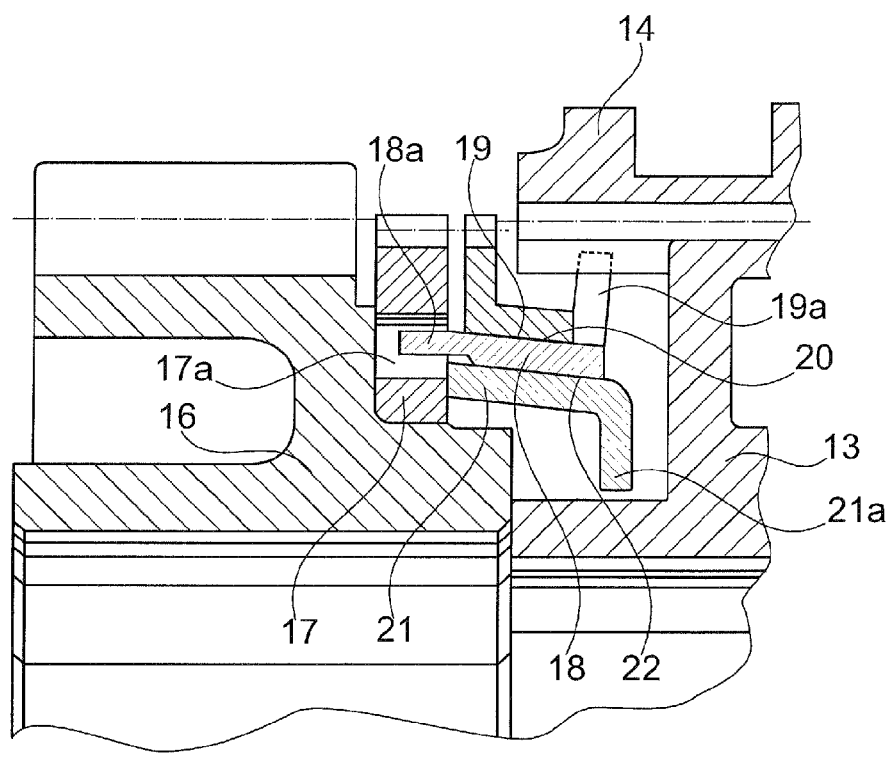
FIG. 1 shows a cross section of a synchronizing device.

FIG. 1 shows by way of example a synchronizing device with an outer synchronizing ring 19, with an intermediate synchronizing ring 18 and with an inner synchronizing ring 21. A synchronizing body 13 is fixed on a transmission shaft by means of an internal toothing in order to provide a rotationally fixed arrangement. A gear selection wheel 16 is arranged next to the synchronizing body 13. Connected to the gear selection wheel 16 is a clutch body 17, into the clearances 17a of which driver bosses 18a of an intermediate ring 18 engage. The intermediate ring 18 forms, with the friction countersurface 9 of the outer synchronizing ring 19 as a countercone 8, a first friction pairing 20 and, with the friction countersurface 9' of the inner synchronizing ring 21, a second friction pairing 22. The friction countersurfaces 9 and 9' are not remachined. The connection of the gear selection wheel 16 and synchronizing body 13 takes place via the sliding sleeve 14.

The inner rim 21a of the inner synchronizing ring 21 is interrupted by clearances and is concealed partially by a step of the synchronizing body 13. The step engages into the clearances, and the inner synchronizing ring 21 is thus connected positively to the synchronizing body 13. The outer synchronizing ring 19 is connected positively via its rim to the synchronizing body 13. The positive connection of the outer synchronizing ring 19 to the synchronizing body 13 takes place via clearances 19a of its rim.

Figure 2:
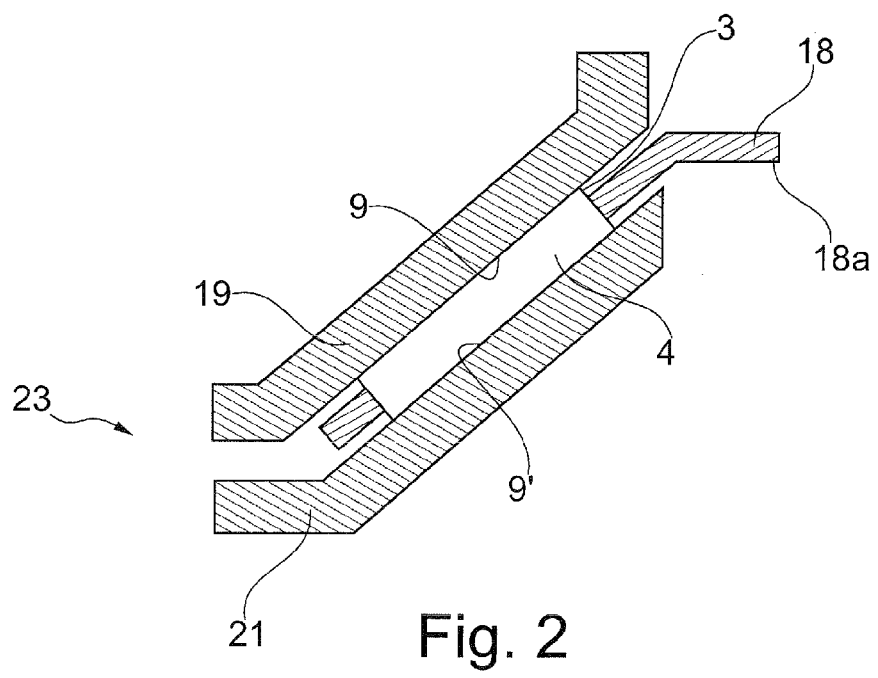
FIG. 2 shows a cross section of a synchronizing device according to the invention with an outer synchronizing ring, an intermediate ring and an inner synchronizing ring.

FIG. 2 shows a synchronizing ring assembly 23 consisting of an outer synchronizing ring 19, of an intermediate ring 18 and of an inner synchronizing ring 21. Between the outer 19 and the inner 21 synchronizing ring, friction elements 4 are arranged in clearances 3 of the intermediate ring 18.

Figure 3:
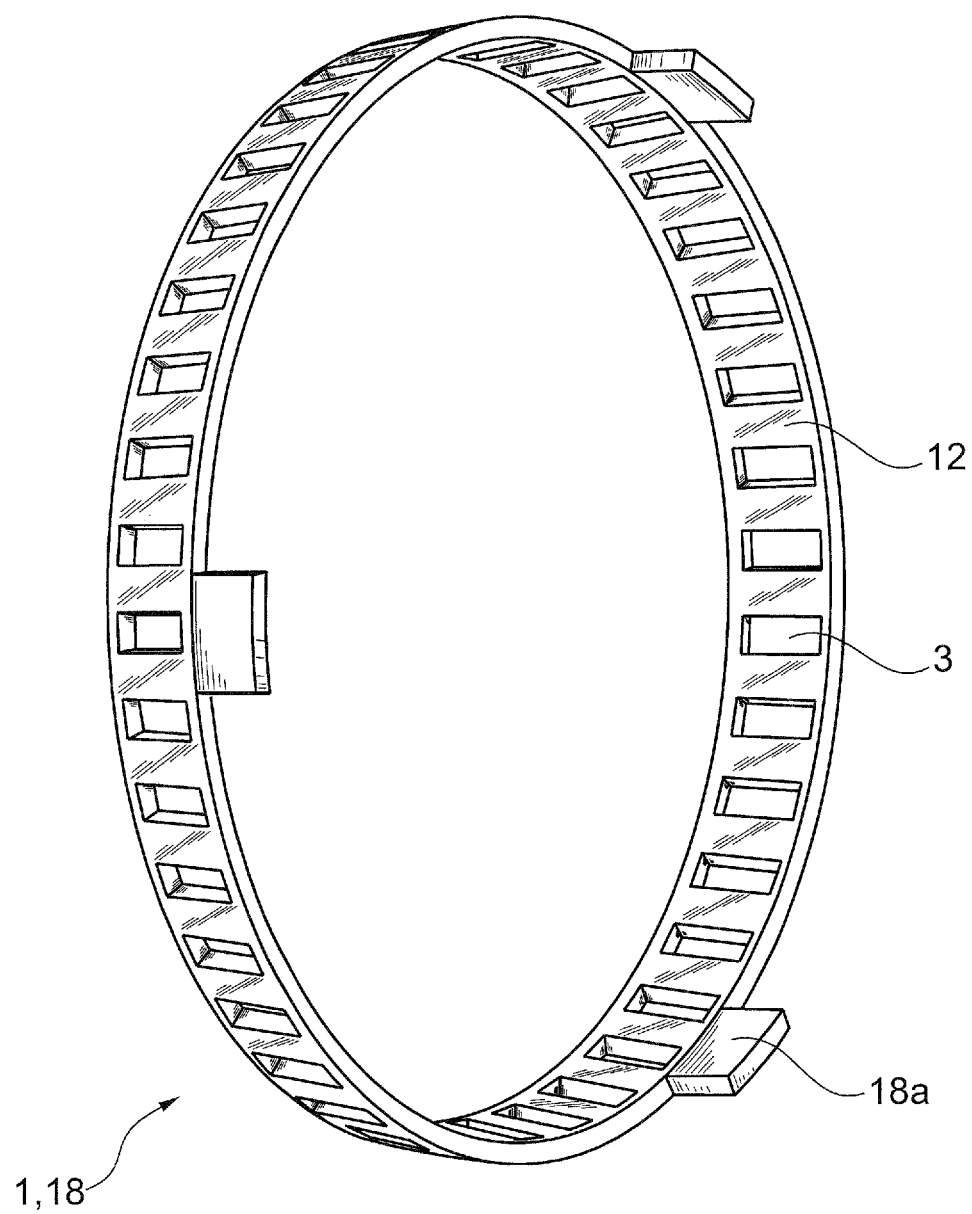
FIG. 3 shows a perspective view of the annular body of an intermediate ring without friction elements.
Figure 4:
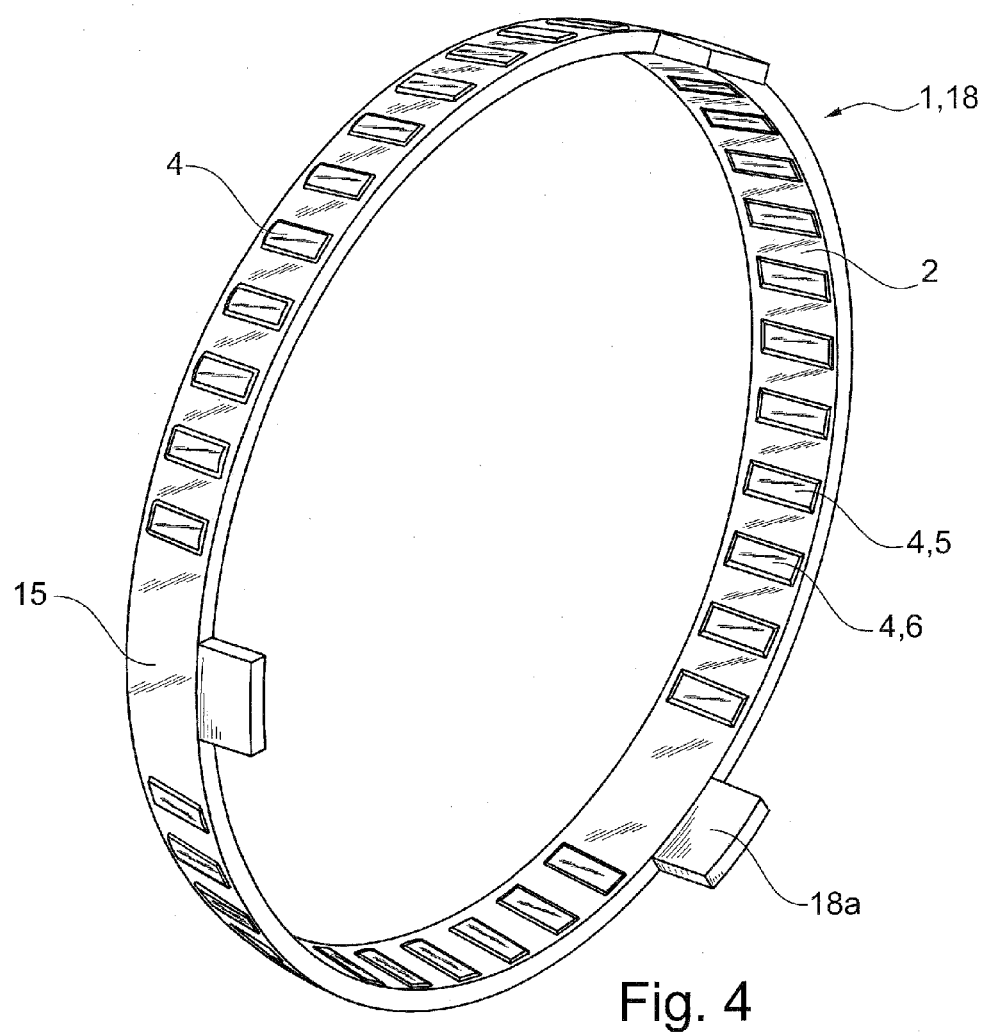
FIG. 4 shows a perspective view of the annular body of another intermediate ring with friction elements.

FIGS. 3 and 4 show in each case a synchronizing ring 1 as an intermediate synchronizing ring 18 with an annular body and recesses 3 which are of virtually rectangular design. In these cases, the recesses are arranged equidistantly and run in the axial direction. In the load-bearing region 15 of the driver bosses 18a, the recesses 3 are absent in the intermediate synchronizing ring 18 of FIG. 4, so that the forces introduced via the driver bosses 18a can be reliably absorbed. The frictional power is reduced only insignificantly as a result. Between the recesses 3, the basic material of the annular body forms grooves 12 which discharge the oil. The play of the friction elements 4 in the recesses amounts to about one millimeter.

Figure 5:
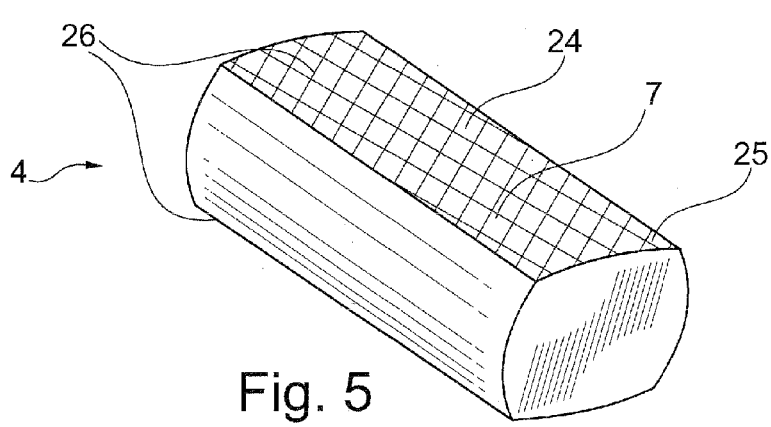
FIG. 5 shows an individual friction element.

FIG. 5 shows a friction element 4 which is curved spherically and has a friction coating 25. The friction element 4 has, furthermore, on its radially oriented surfaces 25, structural surfaces 7 with oil channels 24 which carry away the oil.

LIST OF REFERENCE NUMERALS 1 synchronizing ring
2 annular body
3 recess
4 friction element
5 first friction element
6 second friction element
7 structural surface
8 countercone
9,9' friction countersurface
10 axial end
11 axial end
12 groove 13 synchronizing body
14 sliding sleeve
15 load-bearing region
16 gear selection wheel
17 clutch body
17a clearance
18 intermediate ring
18a driver boss
19 outer synchronizing ring
19a clearance
20 first friction pairing
21 inner synchronizing ring
21a inner rim
22 second friction pairing
23 synchronizing ring assembly
24 oil channel
25 friction coating
26 radially oriented surface

The invention claimed is:

1. A synchronizing ring for a synchronizing device of a motor vehicle transmission, comprising:
   a conical annular body having a plurality of recesses defined therein and having an inner surface area and an outer surface area; and
   friction elements are displaceably arranged in the recesses, the friction elements each having an inner face and an outer face, the inner faces being oriented in a same direction as the inner surface area and the outer faces being oriented in a same direction as the outer surface area of the annular body,
   wherein the annular body forms a cage, which guides the friction elements in the recesses so that the orientation of the inner faces and the outer faces of the friction elements are maintained.

2. The synchronizing ring as claimed in claim 1, wherein the annular body is produced from sheet metal or plastics in a chipless forming process.

3. The synchronizing ring as claimed in claim 1, wherein the recesses are produced by punching.

4. The synchronizing ring as claimed in claim 1, wherein the friction elements are provided with a lining.

5. The synchronizing ring as claimed in claim 1, wherein the inner faces and the outer faces of the friction elements are convex.

6. The synchronizing ring as claimed in claim 1, wherein the friction elements are produced as first friction elements and second friction elements of different materials.

7. The synchronizing ring as claimed in claim 1, wherein the friction elements have surfaces with oil channels.

8. The synchronizing ring as claimed in claim 1, wherein the friction elements are spaced apart from one another, so that grooves are formed from axial ends of the synchronizing ring.

9. The synchronizing ring as claimed in claim 8, wherein the friction elements have a cross-sectional shape that is generally quadrilateral with four curved side segments, so that the grooves run obliquely with respect to an axial direction.

10. The synchronizing ring as claimed in claim 8, wherein the friction elements have an irregular quadrangular shape, so that the grooves run obliquely with respect to the axial direction and widen toward one axial end.

11. The synchronizing ring as claimed in claim 10, wherein the irregular quadrangular shape is a truncated trapezium.

12. A syncromesh having at least one synchronizing ring as claimed in claim 1, and an opposing cone having an opposing friction face, wherein the opposing friction face is not machine finished.

* * * * *